Sept. 21, 1937.  K. SCHWARZ  2,093,489

REPRODUCTION OF SOUND RECORDS

Filed July 2, 1935

INVENTOR
KARL SCHWARZ
BY
ATTORNEY

Patented Sept. 21, 1937

2,093,489

UNITED STATES PATENT OFFICE 2,093,489

REPRODUCTION OF SOUND RECORDS

Karl Schwarz, Berlin, Germany, assignor to Klangfilm G. m. b. H., Berlin, Germany, a corporation of Germany Application July 2, 1935, Serial No. 29,437
In Germany September 22, 1934

2 Claims. (Cl. 179—100.3)

This invention relates to the reproduction of sound records whereon the positive and negative half-cycles of the sound waves are recorded on the sound tracks spaced from one another, and has for its principal object the provision of an improved apparatus for ensuring that the modulated light beams transmitted through different tracks are properly combined in the light sensitive device by which they are converted to corresponding electrical currents.

An apparatus has been provided for reproducing sound records which have the positive and negative halves of the sound waves recorded on separate tracks. In this apparatus three lenses are mounted between the film strip and the photoelectric cells for imaging the two sound tracks on the cathodes of the photo-electric cells connected push-pull (in phase opposition).

The present invention is concerned with an arrangement in which the two photocells are mounted comparatively close to and back of the film strip in a manner somewhat similar to that suggested in connection with the use of a single photocell for reproducing a single track sound record. If an attempt is made to reproduce a photographic sound track in which the positive and the negative halves have been recorded separately by means of the prior art reproducer adapted to handle single track sound records, difficulty in securing a proper distribution of the film modulated light is encountered. In accordance with this invention this difficulty is avoided by the provision of a reflecting barrier mounted in proximity to the film path and interposed between the film and light sensitive cell.

The invention will be better understood from the following description when considered in connection with the accompanying drawing, and its scope will be pointed out in the appended claims.

Referring to the drawing.

Figure 1:
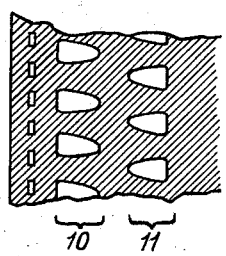
Fig. 1 illustrates a positive sound record of the variable area type.

Fig. 1 illustrates a sound record having variable area sound tracks 10 and 11 of the positive and the negative halves of the sound waves spaced from one another. This film strip is assumed to represent a positive ready to be used and is blackened in those portions which are shaded in Fig. 1. However, it will be understood that the invention will be found equally useful in the case of films in which the positive and negative half cycle sound tracks are recorded by the variable density method.

Figure 2:
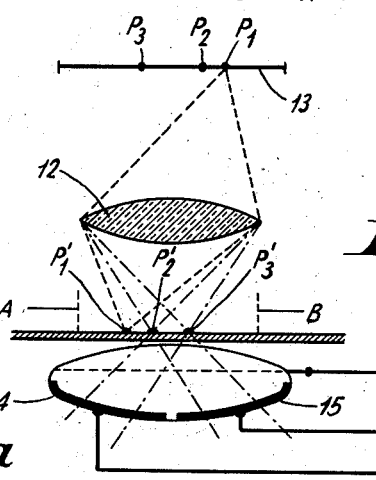
Fig. 2 illustrates an arrangement wherein the photocell is mounted in close proximity to the film path.

The production of a slender line of light for reproducing films of this kind is effected in the same way as in the case of standard sound films bearing a single-track sound record. Thus by the aid of an objective 12, the image of an illuminated slit 13 is thrown upon the film as shown in Fig. 2. The image of this slit 13 is assumed to lie between lines A and B on the film strip. For a proper appreciation of the particular problem arising in the reproduction of a twin-track record such as that illustrated by Fig. 1, it is necessary to consider under what particular circumstances an image of slit 13 is produced upon the film strip. Fundamentally speaking, of course, this picture is obtained in a similar manner as any other optical image. Thus light rays issuing from a definite point $P_1$ of the slit 13 are focussed at a definite point of the image $P_1'$. The marginal rays of the ray pencil causative of the image of point $P_1$ have been traced upon both sides or faces of the lens 12. Now, a similar trajectory of the rays may be found for any other points of the slit 13 such as points $P_2$ and $P_3$. The fringe or marginal rays of the ray pencils imaging the two last mentioned points are traced in the drawing, for the sake of greater clarity of representation, only between the lens 12 and the film, the image of point $P_2$ being denoted by $P_2'$, and the image of point $P_3$ by $P_3'$.

These paths of the light rays posteriorly of the film makes it clear that, in the case of a pick-up of a double-track sound record it is possible to mount two photocells or a twin photo-electric cell directly in the rear of the film. If an attempt is made to mount a twin photocell spaced from the film as shown in Fig. 2 it will be noticed that the light rays which have imaged point $P_3$ of the track 10 will cross the rays which image point $P_2$ a short distance behind the film. In other words, if a twin photocell were mounted at close proximity to and posteriorly of the film it would not be feasible at all to direct the light rays coming from the track 10 exclusively to one of the two cathodes 14, 15 and the light rays coming from sound track 11 exclusively onto the respective other cathode. However, this is required if the photocell currents due to the light transmitted through the film are to be properly combined.

In the reproduction of ordinary single-track sound records this problem does not arise because all that has to be done in this instance is to take care so that all of the light transmitted across the film strip will actually be caused to impinge upon the cathodes of the photocell. In other words, in scanning single-track sound records there are no difficulties in disposing the single photocell then necessary immediately in the rear of the film such as has been done in a great many forms of construction known in the prior art.

Figure 3A:
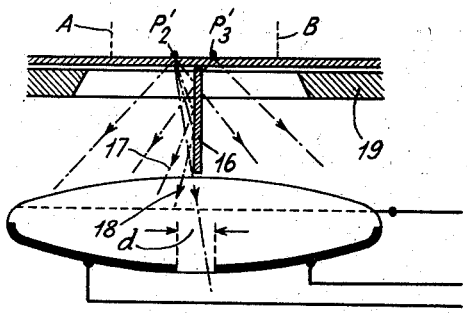
Figs. 3a to 5 illustrate arrangements wherein a bilaterally reflecting element is interposed between the film and light responsive device for ensuring a proper distribution of the modulated light.
Figure 3B:
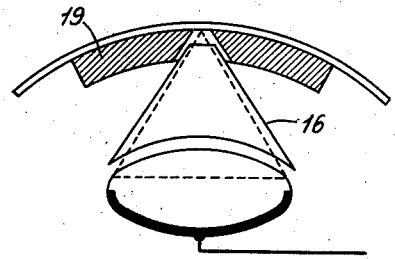

In order that a similarly simple arrangement may be carried into practice in the reproduction of twin-track sound records and that the complicated construction comprising three distinct lenses heretofore proposed may be avoided, a bilaterally reflecting body extending from a point at close proximity to the film, to the twin photocell and the two separate photocell units is provided. An arrangement of this kind is shown in Figs. 3a and 3b in plan and elevation covering the case of a double photocell. In order to graphically show that the problem discussed by reference to Fig. 2 is now actually solved, the light rays have been traced in Fig. 3a which originate from the slit image points $P_2'$ and $P_3'$. As can be seen from this illustration, one of the two marginal rays is reflected from the bilaterally reflective body 16 and thus reaches the right photocell cathode. In a similar fashion, the rays 17 and 18 inside the pencil of rays pertaining to image point $P_2'$ will be reflected from the body 16. Those rays which are positioned so close to the line of symmetry of the ray pencil which issues from point $P_2'$ that they will no longer strike the reflector body 16 will still not reach the wrong photo-electric cell; and in order that this may be so, the distance between the two cathode surfaces within the photo-electric cell must be properly chosen. Inside the plane of the drawing Fig. 3b in which the stationary glide or feed path for the film, similarly as in Fig. 3a, is designated by 19 and in which also the shape of reflective body 16 is more clearly recognizable, there occurs no reflection of the light rays from the reflecting body. The marginal rays of both ray pencils, which by the way, register or coincide in this view, are shown by the broken lines in Fig. 3b.

Figure 4:
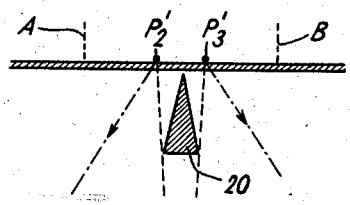

If the bilaterally reflecting body as shown in Fig. 4 is made larger in width towards the photocell so that it assumes the form of a wedge 20, the inter-cathode distance in the cell designated by $d$ in Fig. 3a can be diminished.

Figure 5:
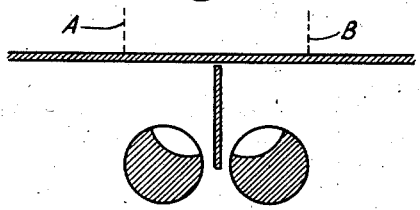

Fig. 5 shows an arrangement which corresponds to that in Fig. 3, though comprising two separate photo-electric cells. In the light of what precedes, further discussion of this embodiment is unnecessary.

I claim:

1. In a device for reproducing sound from a record having the positive and negative half-cycles recorded in tracks spaced from one another, the combination of means for defining a film path, a light sensitive device having two light-sensitive electrodes, and a bilaterally reflecting member extending between said path and said device for directing light from the respective half-cycle tracks to the corresponding electrodes.

2. In a device for reproducing sound from a record having the positive and negative half-cycles recorded in tracks spaced from one another, the combination of means for defining a film path, a light sensitive device having two light-sensitive electrodes, and a bilaterally reflecting member located intermediate said tracks and extending between said path and said device for directing light from the respective half-cycle tracks to the corresponding electrodes.

KARL SCHWARZ.